United States Patent
Rutkowski et al.

(10) Patent No.: US 9,670,656 B2
(45) Date of Patent: Jun. 6, 2017

(54) QUICK RELEASE MECHANISMS FOR PLUMBING TOOLS

(71) Applicant: Ridge Tool Company, Elyria, OH (US)

(72) Inventors: Michael J. Rutkowski, Brunswick, OH (US); Jon R. Dunkin, Elyria, OH (US)

(73) Assignee: Ridge Tool Company, Elyria, OH (US)

( * ) Notice: Subject to any disclaimer, the term of this patent is extended or adjusted under 35 U.S.C. 154(b) by 327 days.

(21) Appl. No.: 14/499,423

(22) Filed: Sep. 29, 2014

(65) Prior Publication Data
US 2015/0113748 A1    Apr. 30, 2015

Related U.S. Application Data

(60) Provisional application No. 61/896,174, filed on Oct. 28, 2013.

(51) Int. Cl.
*E03C 1/302* (2006.01)
*B08B 9/045* (2006.01)
(Continued)

(52) U.S. Cl.
CPC .......... *E03C 1/302* (2013.01); *B08B 9/045* (2013.01); *F16D 1/108* (2013.01); *F16D 1/112* (2013.01);
(Continued)

(58) Field of Classification Search
CPC .......... E03C 1/302; E03F 9/002; E03F 9/005; B08B 9/04; B08B 9/043; B08B 9/0436; B08B 9/045; Y10S 403/04; Y10S 403/06; Y10T 403/59; Y10T 403/591; Y10T 403/592; Y10T 403/599; Y10T 403/60; Y10T 403/602; Y10T 403/604; Y10T 74/20642; Y10T 74/20744; F16D 1/10; F16D 1/108; F16D 1/112; F16D 1/116; F16D 2001/102; F16D 2001/103;
(Continued)

(56) References Cited

U.S. PATENT DOCUMENTS

| | | | | |
|---|---|---|---|---|
| 1,353,299 A | * | 9/1920 | Wilson ............... | B23B 31/1071 279/75 |
| 1,851,766 A | * | 3/1932 | Hotchkiss, Jr. ......... | E03C 1/302 15/104.33 |

(Continued)

FOREIGN PATENT DOCUMENTS

| | | |
|---|---|---|
| CN | 2389181 | 7/2000 |
| DE | 1784116 | 3/1972 |

(Continued)

OTHER PUBLICATIONS

China—Patent Application No. 201410548640.6; Sep. 29, 2015; 14 pages.

(Continued)

*Primary Examiner* — Mark Spisich
(74) *Attorney, Agent, or Firm* — Mark E. Bandy; Rankin, Hill & Clark LLP

(57) ABSTRACT

Quick release mechanisms for auger type cleanout tools are described. The mechanisms enable engagement and disengagement of a handle to an auger without the use of separate retainers or fasteners. Also described are auger type tools and related methods of use utilizing the quick release mechanisms.

9 Claims, 7 Drawing Sheets

(51) Int. Cl.
 *F16D 1/112* (2006.01)
 *G05G 1/08* (2006.01)
 *F16D 1/108* (2006.01)

(52) U.S. Cl.
 CPC .............. *G05G 1/085* (2013.01); *Y10S 403/04* (2013.01); *Y10S 403/06* (2013.01); *Y10T 74/20642* (2015.01); *Y10T 403/592* (2015.01); *Y10T 403/599* (2015.01); *Y10T 403/602* (2015.01); *Y10T 403/7039* (2015.01)

(58) Field of Classification Search
 CPC . G05G 1/085; B25G 3/12; B25G 3/20; B25G 3/22; B25G 3/24
 USPC ................... 15/104.31–104.33; 74/528, 545; 4/255.01; 403/321, 321.1, 322.2, 403/325–328, DIG. 4, DIG. 6
 See application file for complete search history.

(56) References Cited

U.S. PATENT DOCUMENTS

| | | | | |
|---|---|---|---|---|
| 1,910,768 | A | * | 5/1933 | Hotchkiss, Jr. ......... E03C 1/302 144/104 |
| 2,062,108 | A | | 11/1936 | Rickerson |
| 2,290,215 | A | * | 7/1942 | Stenberg ............... B24B 45/006 279/75 |
| 2,472,392 | A | * | 6/1949 | Alexander .......... B25B 23/0035 279/74 |
| 3,260,541 | A | * | 7/1966 | Sadler .................... A01B 71/06 403/325 |
| 3,693,484 | A | * | 9/1972 | Sanderson, Jr. ........ B25B 13/48 403/325 |
| 3,722,008 | A | * | 3/1973 | Boldan .................. E03C 1/302 4/255.01 |
| 4,364,140 | A | | 12/1982 | Irwin |
| 4,391,543 | A | * | 7/1983 | Elsing ................. G11B 17/038 206/308.3 |
| 4,395,791 | A | | 8/1983 | Irwin |
| 4,663,796 | A | * | 5/1987 | Helling .................... B25G 3/20 15/144.2 |
| 4,692,957 | A | | 9/1987 | Kovacs |
| 4,900,182 | A | * | 2/1990 | Stillwagon ............ E05B 63/121 403/322.2 |
| 5,230,116 | A | | 7/1993 | Rodriguez |
| 5,987,684 | A | | 11/1999 | Evans |
| 6,158,076 | A | | 12/2000 | Rutkowski et al. |
| 6,360,397 | B1 | | 3/2002 | Babb |
| 6,421,871 | B1 | | 7/2002 | Peach et al. |
| 6,470,525 | B1 | | 10/2002 | Silverman |
| 8,359,696 | B1 | * | 1/2013 | Turner .................... B08B 9/045 15/104.03 |
| 2003/0190183 | A1 | | 10/2003 | Hsing |
| 2005/0109170 | A1 | * | 5/2005 | Chang .................... B25G 1/005 81/177.2 |
| 2005/0193508 | A1 | | 9/2005 | Rutkowski et al. |
| 2008/0244816 | A1 | | 10/2008 | Babb et al. |
| 2009/0218774 | A1 | * | 9/2009 | Lin ..................... B23B 31/1071 279/76 |
| 2010/0229693 | A1 | * | 9/2010 | Chen .................. B23B 31/1071 81/60 |

FOREIGN PATENT DOCUMENTS

| | | | |
|---|---|---|---|
| EP | 225554 | * | 6/1987 |
| EP | 227112 | * | 7/1987 |
| EP | 1522743 | * | 4/2005 |
| GB | 2098301 | * | 11/1982 |
| JP | 63-266213 | * | 11/1988 |

OTHER PUBLICATIONS

China—Patent Application No. 201410548640.6; May 10, 2016; 17 pages.
Chinese Office Action—Patent Application No. 201410548640.6; Oct. 31, 2016; 22 pages.

* cited by examiner

QUICK RELEASE MECHANISMS FOR PLUMBING TOOLS

CROSS REFERENCES TO RELATED APPLICATIONS

This application claims priority upon U.S. provisional application Ser. No. 61/896,174 filed Oct. 28, 2013.

FIELD

The present subject matter relates to augers and plumbing tools for clearing stoppages or clogs in waste pipes and particularly those leading from sinks, urinals, and toilets. More particularly, the present subject matter relates to assemblies for engaging handles or other components to an auger.

BACKGROUND

Augers and related plumbing tools are known in which the auger can be manually operated such as by use of a handle on an offset crank. Drain cleaners are also known which can be powered by attachment of a handheld drill or other source of rotary power. More recently, handheld drain cleaning tools have been developed that enable an operator to utilize either a manual or a powered mode of operation.

However, difficulties arise in converting or switching from one mode of operation to another. Disengaging a handle or hand crank so that a powered driver may be engaged may involve removal of retainers or other fasteners. Removal or attachment of fasteners typically requires the use of other tools. In addition, the retainers or fasteners typically become separated from the auger and eventually lost. Furthermore, even if not lost, it is often difficult to re-attach a hand crank using the retainers or fasteners, particularly after repeated use of the auger and collection of dirt and debris thereon.

Accordingly, a need exists for an assembly that avoids these problems and enables quick and convenient engagement and/or disengagement of a handle or hand crank relative to an auger or similar plumbing tool.

SUMMARY

The difficulties and drawbacks associated with previously known augers are addressed in the present apparatus for an auger or plumbing tool and related methods of use.

In one aspect, the present subject matter provides a quick release assembly for an auger plumbing tool. The assembly comprises an auger drive having an exposed outwardly extending rod. The rod defines a distal end and an outer surface proximate the distal end. The rod also defines a recess along the outer surface. The assembly also comprises a crank member engageable with and separable from the rod of the auger drive. The crank member includes (i) a collar affixed to an end of the crank member, (ii) a positionable sleeve disposed on the collar and movably retained on the collar, and (iii) a plurality of spherical members disposed about an outer periphery of the collar and disposed within an annular region defined between the collar and the sleeve. The collar defines a generally hollow receiving region adapted to receive the distal end of the rod of the auger drive. The collar also defines a plurality of apertures extending through a wall of the collar thereby providing access to the generally hollow receiving region. Each of the apertures is sized to enable a corresponding spherical member to partially protrude into the generally hollow receiving region yet not pass entirely through the aperture.

In another aspect, the present subject matter provides an auger plumbing tool comprising an elongate housing defining a hollow interior. The housing defines a working end and an operator end. The auger tool also comprises a flexible drain cleaning cable disposed in the hollow interior of the housing. The auger tool additionally comprises an auger drive having an exposed outwardly extending rod. The rod defines a distal end and an outer surface proximate the distal end. The rod defines a recess along the outer surface. The auger tool also comprises a crank member engageable with and separable from the rod of the auger drive. The crank member includes (i) a collar affixed to an end of the crank member, (ii) a positionable sleeve disposed on the collar and movably retained on the collar, and (iii) a plurality of spherical members disposed about an outer periphery of the collar and disposed within an annular region defined between the collar and the sleeve. The collar defines a generally hollow receiving region adapted to receive the distal end of the rod of the auger drive. The collar also defines a plurality of apertures extending through a wall of the collar thereby providing access to the generally hollow receiving region. Each of the apertures is sized to enable a corresponding spherical member to partially protrude into the generally hollow receiving region yet not pass entirely through the aperture.

In yet another aspect, the present subject matter provides a method of releasably engaging a crank handle with an auger, the auger having an exposed rod having a recess proximate an end of the rod. The method comprises incorporating a quick release assembly with a crank handle. The quick release assembly includes (i) a collar affixed to an end of the crank member, (ii) a positionable sleeve disposed on the collar and movably retained on the collar, and (iii) a plurality of spherical members disposed about an outer periphery of the collar and disposed within an annular region defined between the collar and the sleeve. The collar defines a generally hollow receiving region adapted to receive the distal end of the rod of the auger drive. The collar also defines a plurality of apertures extending through a wall of the collar thereby providing access to the generally hollow receiving region. Each of the apertures is sized to enable a corresponding spherical member to partially protrude into the generally hollow receiving region yet not pass entirely through the aperture. The method also comprises positioning the sleeve so that the spherical members are in their unseated position. The method also comprises inserting the end of the rod into the hollow receiving region defined by the collar such that the recess of the auger rod is accessible through the plurality of apertures. And, the method also comprises positioning the sleeve so that the spherical members are in their seated position and contact the recess of the rod, whereby the crank handle is engaged with the auger.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Generally, the present subject matter provides plumbing tool augers having a quick release mechanism that enables a handle and particularly a crank handle, to be rapidly and easily removed from, or attached to, the auger. The quick release mechanism and related methods of use do not require any type of fasteners or other separable components that could otherwise become lost or separated from the auger and/or handle. Engaging or disengaging the components does not require any tools. In addition, the releasable engagement provisions are generally enclosed and protected from dirt, debris, and/or other environmental contaminants.

In one embodiment of the present subject matter, a quick release mechanism comprises a hand crank or handle having a collar and sleeve encapsulating a plurality and in particular three spherical members such as for example, ball bearings. The sleeve and collar are threadedly engaged with one another such that upon screwing or rotating the sleeve in one direction relative to the collar, the balls are seated in apertures in the collar. If the hand crank is initially engaged with an engagement component of the auger such as an outwardly extending rod, the noted rotation of the sleeve causes the spherical members to be further urged against a groove or recess in the rod of the auger to thereby secure the hand crank to the auger. The collar thus engages the rod so that the assembly cannot be axially separated. Screwing or rotating the sleeve in an opposite direction relative to the collar releases the balls so that the hand crank can be removed, i.e., axially separated from the auger, thereby exposing the rod of the auger for drill attachment. As described in greater detail herein, rotational engagement provisions are also included that couple or otherwise rotationally engage the collar and the hand crank to the auger so that rotary motion of the hand crank is transmitted to the auger and specifically, to a drive rod or drive component of the auger.

In another embodiment, a quick release mechanism incorporates a spring or biasing assembly rather than a threaded connection that governs axial engagement between the hand crank and the auger. A spring loaded sleeve of a hand crank can be pulled back to release the balls and allow the hand crank to be installed on a rod of an auger. Once the hand crank is in engagement position, release of the sleeve will result in the spring pushing the sleeve to trap the balls against the rod of the auger. The hand crank can be removed by reversing these operations. Rotational engagement provisions are also included that couple or otherwise rotationally engage the collar and hand crank to the auger.

Figure 1:
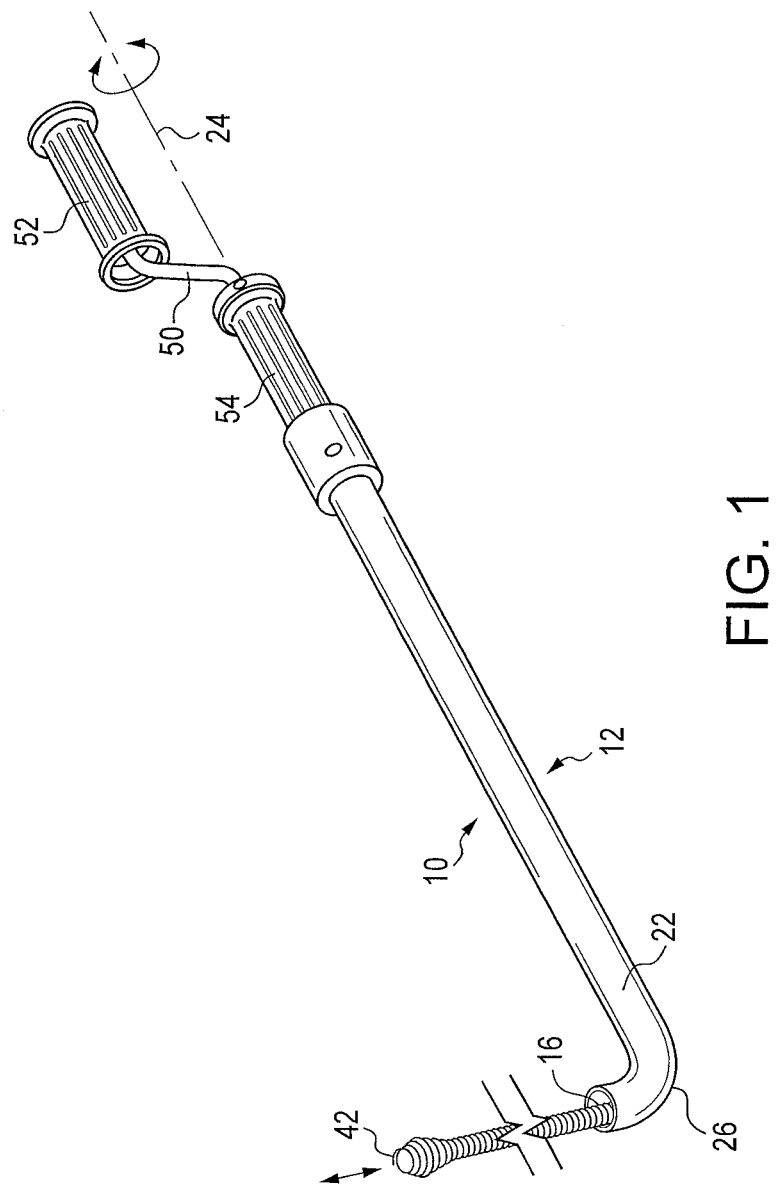
FIG. 1 is a schematic perspective view of a typical auger used for clearing clogs in waste pipes.
Figure 2:
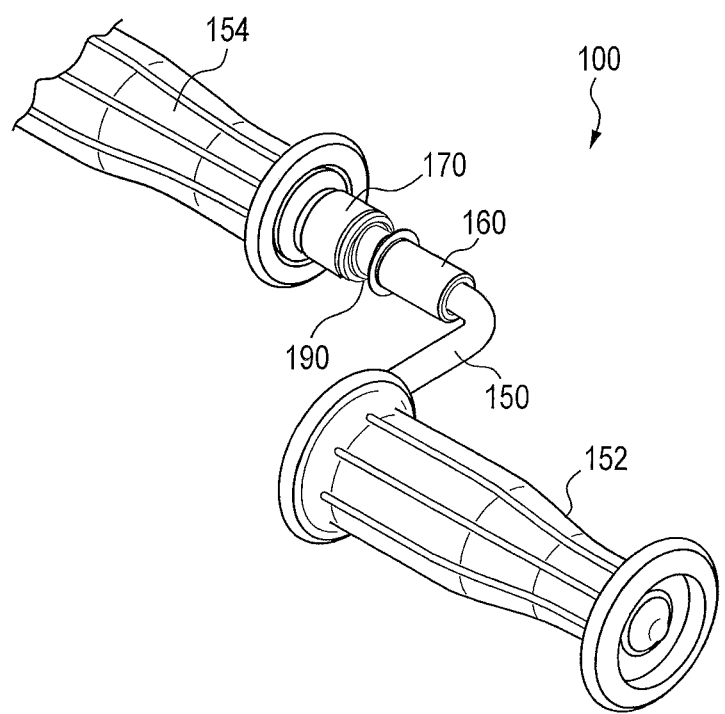
FIG. 2 is a schematic perspective view of a handle region of an auger utilizing a quick release engagement assembly in accordance with the present subject matter.

With reference to the embodiment depicted in FIG. 1, an auger 10 includes a housing 12 and a drain cleaning cable 16 housed in the housing. In view of the enclosed cable 16, the augers described herein are easier and cleaner to use than other known augers which do not include a housing. The type of auger 10 allows the operator to avoid handling the cable, if desired.

In the depicted embodiment of FIG. 1, the auger 10 has a length that is between about two feet (0.8 m) and about 4 feet (1.2 m), and typically about 3 feet (1 m). The auger 10 is particularly useful in cleaning drains of urinals, but it can also be used to clean other drains or components.

The housing 12 in the embodiment depicted in FIG. 1 provides an external enclosure for the auger 10 and the cable 16 therein. The external housing 12 includes an elongate hollow tube 22 that, in the depicted embodiment, has a generally circular configuration in a cross section taken normal to a longitudinal axis 24 of the tube 22. The housing 12 is made from a durable rigid material, for example plastic, metal, or a composite material. The external housing 12 also includes a curved hollow tube 26 at its distal or working end. The distal end of the external housing 12 is preferably curved in the shape illustrated so that the distal end can be inserted into a urinal; however, other curved shapes or other configurations may be used or desired for other operations. The curved hollow tube 26 can also be made from a durable rigid material, for example plastic, metal, or a composite material.

An optional feed mechanism (not shown) may be interposed between the elongate hollow tube 22 and the curved hollow tube 26. Alternatively, the curved hollow tube can also attach to the elongate hollow tube using a hollow connector. Additionally, the elongate hollow tube and the curved hollow tube can be made as an integral, i.e. one-piece, tube.

The drain cleaning cable 16 is received inside the cable housing. The cable 16, as is conventional, is an elongate, flexible member made of tightly wound spring wire. The free or outer end of the cable 16 extends through the curved hollow tube 26 and outwardly beyond its distal end and, in the embodiment illustrated, the outermost end of the cable is formed to provide an auger tip 42. In the embodiment depicted in FIG. 1, approximately three feet (1 m) of cable is provided. The length of the cable, however, will be a function of the length of the outer housing 12.

One or more driven members can be provided for rotating the cable 16 as desired. Typically, the cable 16 is disposed within an inner housing drive tube (not shown in FIG. 1 but described in greater detail herein). The cable 16 can be rotated manually or the cable can be rotated using a powered, e.g. electrical, hydraulic or fuel-powered, machine or motor. The cable rotates about a cable axis that is generally aligned with the longitudinal axis 24. In the embodiment depicted in FIG. 1, a driven member comprises an offset or S-shaped crank bar 50 that connects on one end to the cable and/or an inner housing drive tube and carries on the opposite second or operator end a first handle 52. The bar 50 is bent or otherwise angled so that the first handle 52 is disposed generally parallel to and spaced from the longitudinal axis 24. The handle 52 is adapted for rotation by the operator, thus in turn driving the crank bar 50, about the longitudinal axis 24 to rotate and/or deploy the cable 16 from a distal end of the outer housing 12. When the handle 52 is rotated about the longitudinal axis 24, the cable and/or the inner housing drive tube rotates freely within the outer elongate tube 22. The rotation of the first handle 52 about the longitudinal axis 24 results in the rotation of the cable 16 generally about the longitudinal axis.

With continued reference to FIG. 1, a second handle 54 is connected to a proximal end of the outer housing 12. The second handle 54 is fixed to the outer elongate tube 22 to preclude rotation of the second handle with respect to the outer elongate tube.

Multiple cable feed mechanisms can be provided to deploy selected lengths of the cable 16 from the outer housing 12 and to retract the cable into the housing. Examples of such cable feed mechanisms are described in U.S. Pat. Nos. 4,395,791; 6,158,076; and 6,360,397, and U.S. Patent Application Pub. No. 2005/0193508 and 2008/0244816, each of which are incorporated by reference herein in their entirety. It will be understood that the actual length of the cable 16 extending from the end of the auger 10 shown in FIG. 1 would actually be about 2 feet because the first handle 52 is shown in a non-extended position. Alternatively, upon retracting the cable 16 relative to the housing 12, the handle 52 is extended in a rearward direction away from the handle 54, generally along axis 24.

FIGS. 2-6 schematically illustrate an embodiment of a quick release mechanism in accordance with the present subject matter. Generally, the quick release assembly is disposed between a crank handle 152 and an auger handle 154. Specifically, a quick release assembly 100 is depicted comprising a crank member 150 extending from the crank handle 152. The crank member 150 includes an engagement end 151 defining a generally hollow receiving region sized and adapted for receiving an end of a solid rod 180 of an auger or other plumbing tool. In the illustrated embodiment, the hollow receiving region is accessible at the engagement end 151. The crank member 150 includes a collar 160 and a positionable sleeve 170 described in greater detail herein. In the particular embodiment depicted in FIGS. 2-6, the collar 160 is cylindrical and is affixed or otherwise secured to an end of the crank member 150 and extends outward therefrom to thereby provide the hollow receiving region and in certain embodiments the engagement end 151. However, the present subject matter includes alternate variations of this configuration. The sleeve 170 is disposed about the outer periphery of the collar 160 and is linearly positionable relative to the end 151.

The quick release assembly 100 also comprises a plurality of spherical members 110 which may for example be in the form of spherical ball bearings. The collection of members 110 are disposed about the outer periphery of the collar 160 and in certain embodiments are equally spaced apart from one another. If the collar 160 is cylindrical in form, the spherical members 110 can be equally spaced about the circumference of the collar. The collar 160 defines a plurality of apertures 115 each of which is sized to partially receive a spherical member 110 yet retain the member 110 along the outer periphery of the collar 160 and not allow the member 110 to pass entirely through the aperture 115 in the collar 160 and into the generally hollow receiving region. In certain versions, the apertures 115 are circular and have a diameter that is from about 50% to about 90% of the diameter of the spherical member 110. More particularly, the apertures 115 are sized and/or shaped such that they allow the spherical members 110 to partially protrude within the interior of the collar 160, i.e. the generally hollow receiving region. If the collar is cylindrical, the collar typically includes a circumferential wall through which the apertures 115 extend.

The collection of spherical members 110 are retained along the outer periphery of the collar 160 by the sleeve 170, and particularly within an annular region defined between an outer surface of the collar 160 and an outwardly projecting flange 172 of the sleeve 170.

Figure 3:
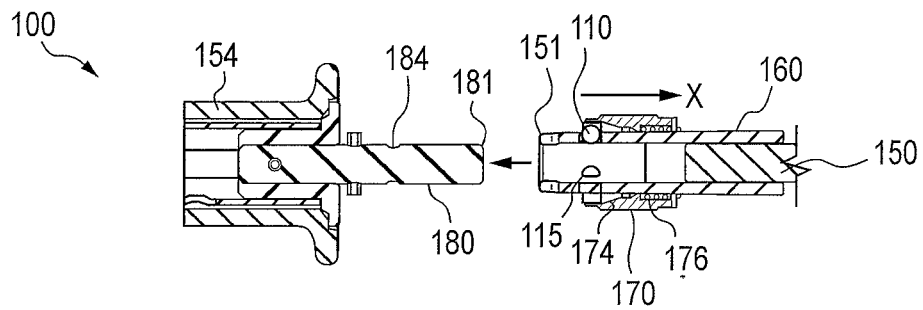
FIG. 3 is a schematic cross sectional view of components of an embodiment of the quick release engagement assembly taken across line AA in FIG. 6 illustrating the components in a disengaged or separated state.
Figure 4:
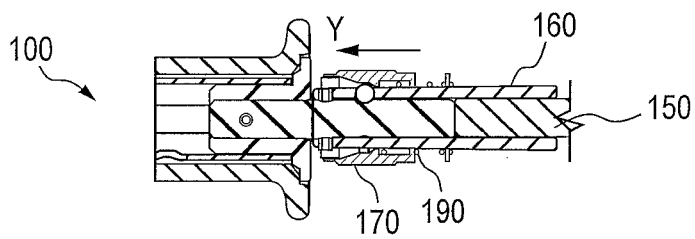
FIG. 4 is a schematic cross sectional view of the engagement assembly taken across line AA in FIG. 6 in an engaged state.
Figure 5:
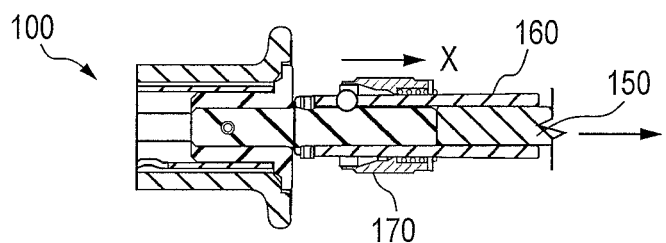
FIG. 5 is a schematic cross sectional view of the engagement assembly taken across line AA in FIG. 6 during disengagement from an engaged state.

In the particular version depicted in FIGS. 3-5, the annular region includes a narrowing ceiling resulting from an inclined interior wall 174 of the sleeve 170. Thus, upon linear displacement of the sleeve 170 in the X direction shown in FIG. 3, the spherical members 110 are loosely retained in or proximate their corresponding apertures 115, i.e., referred to herein as their unseated position. Upon linear displacement of the sleeve 170 in the Y direction shown in FIG. 4, the spherical members 110 contact the inclined interior wall 174 of the sleeve 170, and are urged radially inward into the apertures 115 and into a seated position. When in their seated positions, the spherical members 110 protrude into the generally hollow receiving region within the interior of the collar 160.

In a particular version of the quick release assembly 100, upon engagement of the solid rod 180 with the crank member 150, the rod 180 is disposed within the hollow receiving region defined by the collar 160. A circumferential groove or recess 184 defined along the outer surface of the rod 180 is located under and/or accessible through the plurality of apertures 115 defined in the wall of the collar 160. Upon seating of the spherical members 110 in their corresponding apertures 115, each of the spherical members is received within and/or contacts the recess 184 or at least a portion of the recess 184 defined along the outer surface of the rod 180. This provides axial engagement between the crank member 150 and the rod 180 of the auger. As described in greater detail herein, a slot 135 (see FIGS. 14 and 15) or receiving region in the collar 160 and particularly at an engagement end 151 of the crank member 150, engages with a pin 134 (see FIG. 7) to thereby rotatingly engage the collar 160 and crank member 150 with the rod 180.

A variety of configurations and biasing arrangements can be used for positioning the sleeve 170 and/or for urging the sleeve 170 to one or more positions relative to the engagement end 151 of the crank member 150. In the embodiment shown in FIGS. 2-6, the quick release assembly 100 comprises a biasing member or spring 190 which is captured or otherwise retained along the collar 160 or crank member 150 and urges the sleeve 170 toward the engagement end 151. In this particular embodiment, as a result of biasing from the spring 190, the spherical members 110 are urged to a seated position in their apertures 115.

The spring 190 is positioned about the outer periphery of the collar 160 and between the sleeve 170 and the collar 160. The spring 190 is located between an end wall 176 provided by the sleeve 170 and an affixment member 162 of the collar 160. It will be appreciated that the present subject matter includes a wide array of alternate configurations and arrangements for retention and mounting of the spring 190 or other biasing member(s).

As previously noted, in another embodiment, the quick release assembly uses a threaded engagement between the sleeve 170 and the collar 160. It is also contemplated that both threaded engagement provisions and one or more biasing members could be used in combination with one another and/or in combination with other assemblies.

Engagement and disengagement between a crank member 150 and a solid rod 180 of an auger using the quick release assembly 100 are as follows. The crank member 150 is oriented with the solid rod 180 of an auger such that the generally hollow receiving end 151 of the collar 160 is facing a distal end 181 of the rod 180. The collar 160 is aligned with the longitudinal axis of the solid rod 180 as shown in FIG. 3. The sleeve 170 is displaced away from the end 151 in the X direction as depicted in FIG. 3. Such displacement results in compression of the spring 190. Displacement of the sleeve 170 away from the end 151 releases the spherical members 110 from their seated position in their corresponding apertures 115.

Next, the distal end 181 of the solid rod 180 is inserted into the end 151 and specifically within the generally hollow receiving region of the collar 160. The collar 160 and the solid rod 180 are urged or otherwise displaced toward one another to their engagement state as shown in FIG. 4. The sleeve 170 is then displaced toward the end 151 as shown in FIG. 4 by positioning of the sleeve 170 in the direction Y. As will be understood, displacement of the sleeve 170 toward the end 151 of the collar 160 urges the spherical members 110 radially inward and into their seated position in their respective apertures 115. Upon seating of each of the spherical members 110, a portion of the members 110 protrudes into the generally hollow receiving region. A portion of each member 110 also extends into the recess 184 defined in the solid rod 180. The recess 184 can be in the form of a recessed groove extending about the periphery of the solid rod 180. In addition, a pin associated with the rod 180 is engaged and received within a slot 135 formed in the collar 160 accessible at the end 151 (described in greater detail herein). Thus, upon engagement between the crank member 150 and the rod 180 and displacement of the sleeve 170 toward the end 151 of the collar 160 to a sleeve extended position as shown in FIG. 4, the crank member 150 and the rod 180 are engaged and secured to each other.

The crank member 150 and the rod 180 are disengaged from each other by moving the sleeve 170 in the direction X shown in FIG. 5 and away from the end 151 of the collar 160, thereby releasing the spherical members 110 from their seated position. The crank member 150 and the rod 180 are then displaced apart and separated from one another.

Figure 14:
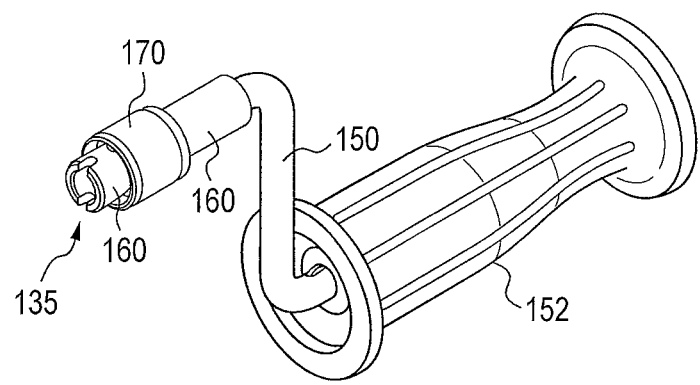
FIG. 14 is a schematic perspective view of the separable crank handle used in an auger of the present subject matter.
Figure 15:
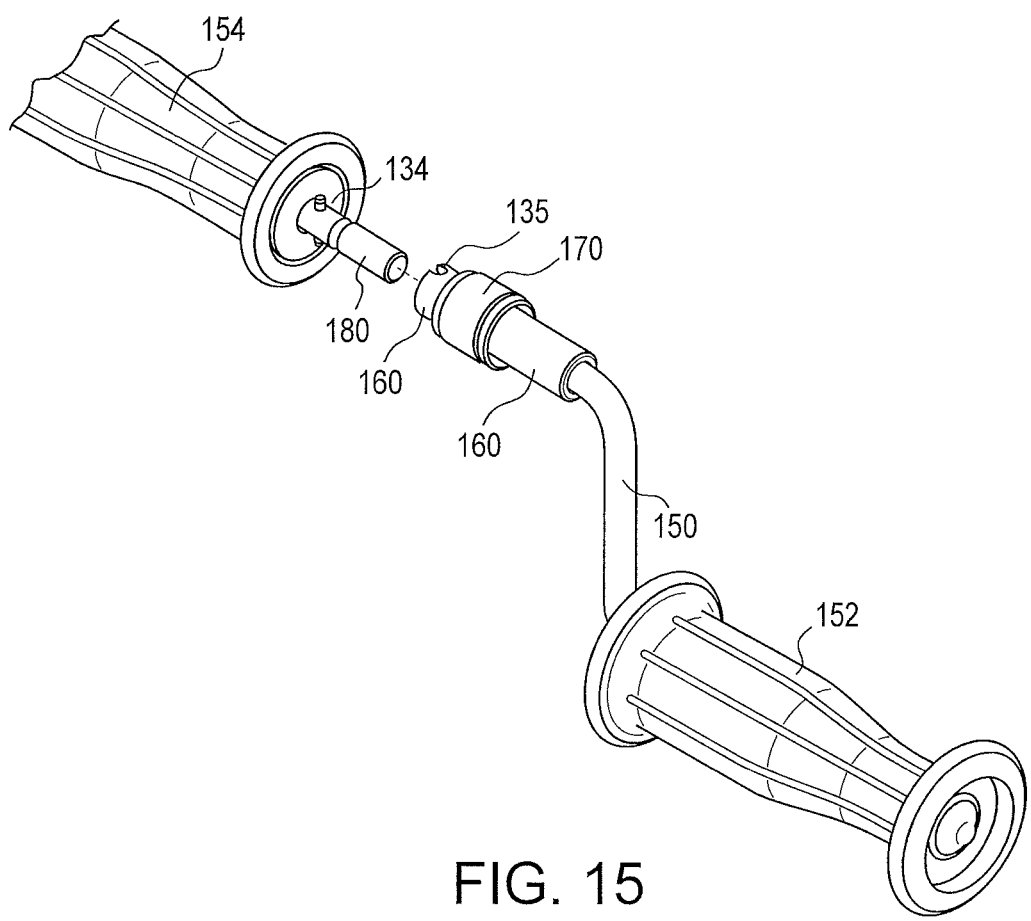
FIG. 15 is another schematic perspective view of a handle region of an auger using a quick release engagement assembly of the present subject matter, illustrating engagement and disengagement between the separable crank handle and a handle region of the auger.

Referring to FIGS. 14 and 15, in the particular embodiments described and illustrated herein, a pin 134 is provided in the rod 180 of the auger. The collar 160 includes a slot 135 or receiving region that is sized and shaped to accommodate the pin 134 upon engagement of the assembly. Positioning of the pin 134 within the slot 135 rotationally engages the crank 150 with the rod 180 of the auger.

Figure 7:
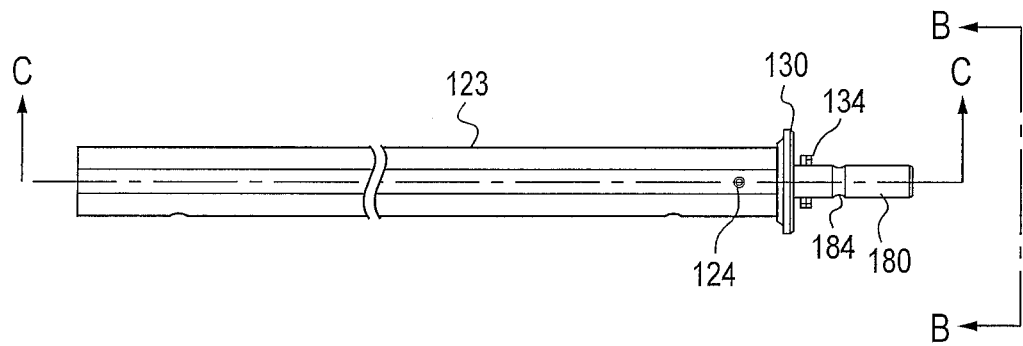
FIG. 7 is a schematic elevational view of a portion of an inner housing drive tube of an auger depicting an exposed outwardly extending rod in accordance with the present subject matter.
Figure 8:
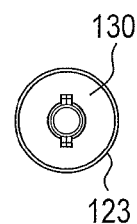
FIG. 8 is a schematic end view of the inner housing shown in FIG. 7 taken from line BB.
Figure 9:
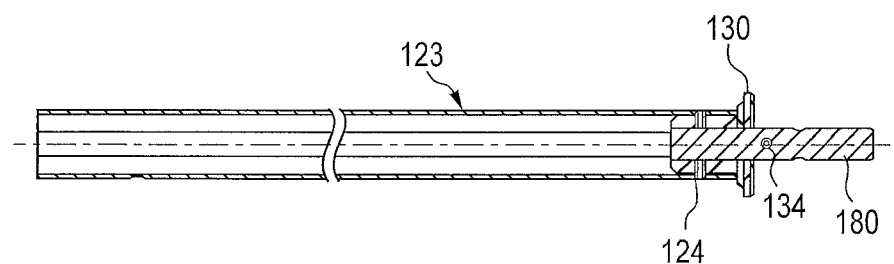
FIG. 9 is a schematic cross sectional view of the inner housing in FIG. 7 taken across line CC.
Figure 10:
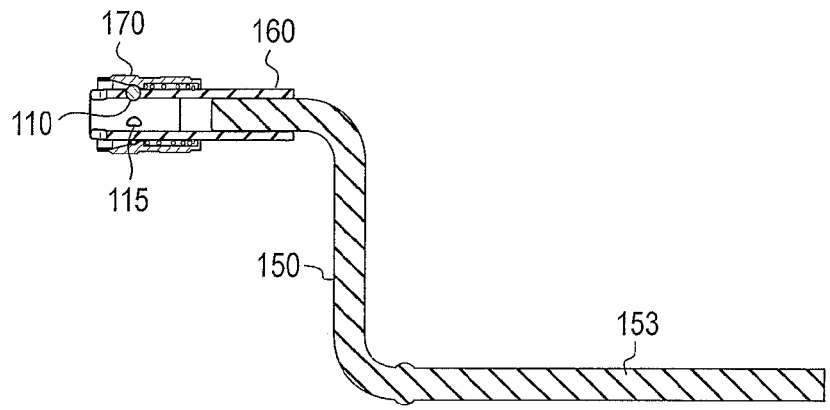
FIG. 10 is a schematic cross sectional view taken across line DD in FIG. 12, of a releasable crank handle used in an auger in accordance with the present subject matter.
Figure 11:
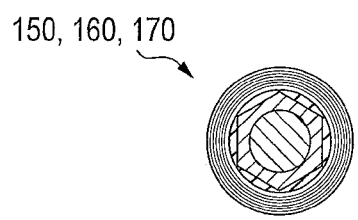
FIG. 11 is a schematic cross sectional view taken across line EE in FIG. 12 depicting a region of the crank handle.
Figure 12:
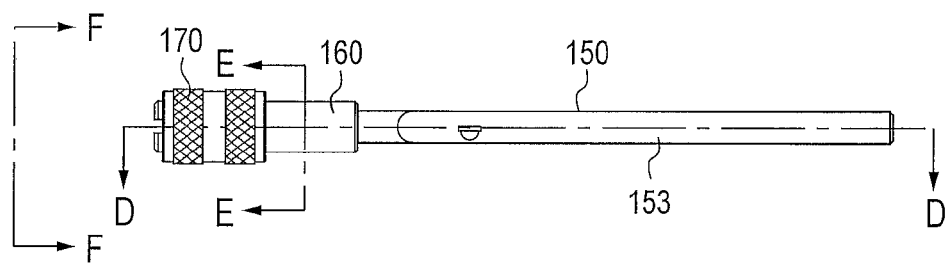
FIG. 12 is a schematic elevational view of the crank handle used in an auger of the present subject matter.
Figure 13:
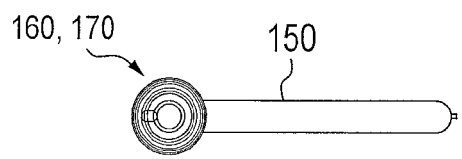
FIG. 13 is a schematic end view taken from line FF in FIG. 12 showing the noted crank handle.

FIGS. 7-9 illustrate an end region of an auger inner housing drive tube 123 having the solid rod 180 releasably affixed thereto. One or more retention pins 124 can be used to releasably retain the solid rod 180 to the housing 123. In the particular embodiment illustrated, the assembly includes a circular base 130 which receives a portion of the solid rod 180. The solid rod 180 may also include one or more stop members or utilize the drive pin 134 with which the collar 160 engages upon the coupling crank member 150 and the solid rod 180 as shown in FIG. 4.

Figure 6:
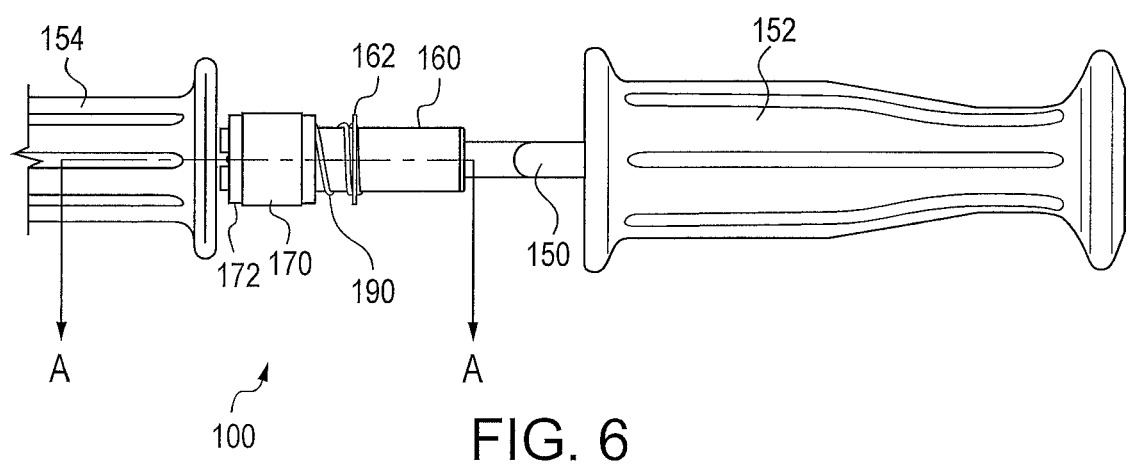
FIG. 6 is a schematic elevational view of the components of the quick release engagement assembly in an engaged state.

FIGS. 10-13 illustrate the crank member 150, associated collar 160, the sleeve 170, and spherical members 110 in greater detail. As noted, the present subject matter includes a variety of alternate configurations and component variations. For example the sleeve 170 in FIGS. 10-13 is depicted as having a length greater than the length of the sleeve 170 shown in FIGS. 2-6. The crank member 150 includes a mounting region 153 for a crank handle 152 such as shown in FIG. 6. As will be appreciated, a crank handle (not shown in FIGS. 10-13) is rotatably mounted on region 153 of the crank member 150.

Incorporation of a quick release assembly in a plumbing tool and particularly in conjunction with a crank handle of an auger, enables rapid and easy engagement and disengagement between the crank handle and auger. Furthermore, no fasteners or other components become separated from the auger or assembly. In addition, no additional tools are required to engage or disengage the components. Moreover, the particular assembly described herein reduces the potential for collection of dirt and debris that would otherwise interfere with engagement of the components. It will be understood that the present subject matter can be implemented in a wide array of devices, tools, and systems. For example, although the present subject matter has been described herein in terms of an auger, and generally illustrated as a urinal auger, it will be appreciated that the present subject matter can be utilized in association with toilet augers, closet augers, drain cleaning augers, and the like.

Many other benefits will no doubt become apparent from future application and development of this technology.

All patents, published applications, and articles noted herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A quick release assembly for an auger plumbing tool, the assembly comprising:
    an auger drive having an exposed outwardly extending rod, the rod defining a distal end and an outer surface proximate the distal end, the rod defining a recess along the outer surface and a pin radially projecting from the outer surface of the rod;
    a crank member engageable with and separable from the rod of the auger drive, the crank member including (i) a collar affixed to an end of the crank member, (ii) a positionable sleeve disposed on the collar and movably retained on the collar, and (iii) a plurality of spherical members disposed about an outer periphery of the collar and disposed within an annular region defined between the collar and the sleeve, wherein the collar defines a generally hollow receiving region adapted to receive the distal end of the rod of the auger drive, the collar also defining a plurality of apertures extending through a wall of the collar thereby providing access to the generally hollow receiving region, each of the apertures sized to enable a corresponding spherical member to partially protrude into the generally hollow receiving region yet not pass entirely through the aperture, and the collar further defining a slot oriented to receive and engage the pin of the rod upon engagement between the crank member and the rod.

2. The quick release assembly of claim 1 wherein the crank member further includes a biasing member to urge the positionable sleeve toward an engagement end of the crank member to a position on the collar.

3. The quick release assembly of claim 1 wherein the collar and the sleeve are threadedly engaged with one another such that rotation of the sleeve relative to the collar results in linear displacement of the sleeve relative to the collar.

4. The quick release assembly of claim 1 wherein the rod of the auger drive is disposed within the hollow receiving region defined by the collar, and the recess defined along the outer surface of the rod is accessible through the plurality of apertures defined in the wall of the collar.

5. The quick release assembly of claim 4 wherein each of the spherical members is seated in a corresponding aperture of the plurality of apertures and each of the spherical members contacts the recess defined along the outer surface of the rod.

6. An auger plumbing tool comprising:
an elongate housing defining a hollow interior, the housing defining a working end and an operator end;
a flexible drain cleaning cable disposed in the hollow interior of the housing;
an auger drive having an exposed outwardly extending rod, the rod defining a distal end and an outer surface proximate the distal end, the rod defining a recess along the outer surface and a pin radially projecting from the outer surface of the rod;
a crank member engageable with and separable from the rod of the auger drive, the crank member including (i) a collar affixed to an end of the crank member, (ii) a positionable sleeve disposed on the collar and movably retained on the collar, and (iii) a plurality of spherical members disposed about an outer periphery of the collar and disposed within an annular region defined between the collar and the sleeve, wherein the collar defines a generally hollow receiving region adapted to receive the distal end of the rod of the auger drive, the collar also defining a plurality of apertures extending through a wall of the collar thereby providing access to the generally hollow receiving region, each of the apertures sized to enable a corresponding spherical member to partially protrude into the generally hollow receiving region yet not pass entirely through the aperture, and the collar further defining a slot oriented to receive and engage the pin of the rod upon engagement between the crank member and the rod.

7. The auger of claim 6 wherein the crank member further includes a biasing member to urge the positionable sleeve to a position on the collar.

8. The auger of claim 6 wherein the collar and the sleeve are threadedly engaged with one another such that rotation of the sleeve relative to the collar results in linear displacement of the sleeve relative to the collar.

9. A method of releasably engaging a crank handle with an auger plumbing tool, the auger plumbing tool having an exposed rod having a recess proximate an end of the rod, the auger including a pin radially projecting from an outer surface of the rod the method comprising:
incorporating a quick release assembly with a crank handle, the quick release assembly including (i) a collar affixed to an end of the crank handle, (ii) a positionable sleeve disposed on the collar and movably retained on the collar, and (iii) a plurality of spherical members disposed about an outer periphery of the collar and disposed within an annular region defined between the collar and the sleeve, wherein the collar defines a generally hollow receiving region adapted to receive the distal end of the rod of the auger, the collar also defining a plurality of apertures extending through a wall of the collar thereby providing access to the generally hollow receiving region, each of the apertures sized to enable a corresponding spherical member to partially protrude into the generally hollow receiving region yet not pass entirely through the aperture, and the collar further defining a slot oriented to receive and engage the pin of the auger upon engagement between the crank handle and the auger;
positioning the sleeve so that the spherical members are in their unseated position;
inserting the end of the rod into the hollow receiving region defined by the collar such that the recess of the rod is accessible through the plurality of apertures;
positioning the sleeve so that the spherical members are in their seated position and contacting the recess of the rod and positioning the pin of the auger plumbing tool in the slot of the collar, whereby the crank handle is engaged with the auger plumbing tool.

\* \* \* \* \*